(12) United States Patent
Müller et al.

(10) Patent No.: US 10,578,427 B2
(45) Date of Patent: Mar. 3, 2020

(54) APPARATUS AND METHOD FOR MEASURING THE TORSION OF A TEST OBJECT

(71) Applicant: fos4X GmbH, München (DE)

(72) Inventors: Mathias Müller, Gröbenzell (DE);
Florian Rieger, München (DE);
Thomas Grübler, München (DE);
Benjamin Zorn, München (DE)

(73) Assignee: fos4X GmbH, München (DE)

( * ) Notice: Subject to any disclaimer, the term of this patent is extended or adjusted under 35 U.S.C. 154(b) by 0 days.

(21) Appl. No.: 16/474,297

(22) PCT Filed: Dec. 22, 2017

(86) PCT No.: PCT/EP2017/084486
§ 371 (c)(1),
(2) Date: Jun. 27, 2019

(87) PCT Pub. No.: WO2018/122195
PCT Pub. Date: Jul. 5, 2018

(65) Prior Publication Data
US 2019/0339066 A1  Nov. 7, 2019

(30) Foreign Application Priority Data
Dec. 27, 2016  (DE) .......... 10 2016 125 730

(51) Int. Cl.
*G01B 11/26* (2006.01)
*G01B 11/16* (2006.01)
*F03D 17/00* (2016.01)

(52) U.S. Cl.
CPC ............ *G01B 11/168* (2013.01); *F03D 17/00* (2016.05); *G01B 11/18* (2013.01); *G01B 11/26* (2013.01); *F05B 2270/804* (2013.01)

(58) Field of Classification Search
CPC .. G02B 6/4434; G02B 6/4471; G02B 6/4495; G02B 6/441; G02B 6/3897;
(Continued)

(56) References Cited

U.S. PATENT DOCUMENTS

2009/0297105 A1  12/2009  Konstadinidis et al.
2010/0189399 A1*  7/2010  Sillard ............... G02B 6/02019
385/126
(Continued)

FOREIGN PATENT DOCUMENTS

CN  203704884 U  7/2014
DE     3638345 A1  5/1988
(Continued)

OTHER PUBLICATIONS

Florian Rieger, "Verification of a fiber optic torsion sensor" (Verfifizierung eines faseroptischen Torsionssensors), Chair for measuring system and sensor technology, 201707041 2084400DE Technische University Mtinchen (TUM), Germany date Mar. 17, 2016.

(Continued)

*Primary Examiner* — Michael P Stafira
(74) *Attorney, Agent, or Firm* — Moser Toboada

(57) ABSTRACT

The invention discloses an apparatus for measuring the torsion between a first point (41) and a second point (42) of a test object (1), said second point being spaced apart from the first point. The apparatus comprises the following: a source of polarized light, comprising a polarizing light source (15) that emits polarized light, or a polarizer (20) that is connected to a light source (10) by way of an optical feed; a first optical fibre (40) that is optically connected to the Output of the polarizing light source (15) or to the Output of the polarizer (20) and that is fastened to the test object (1) at the first point (41) and at the second point (42) in such a
(Continued)

way that a torsion of the test object about a torsion axis causes a change in the angle of rotation of the first optical fibre from the first point in relation to the second point, and a second polarization-maintaining optical fibre (50), that is connected to the first optical fibre (40) at the second point (42) or downstream of the second point (42) in relation to the light path Coming from the source, for supplying the light to a measuring device (30, 31), wherein the distance between the first point (41) and the second point (42) of the test object (1) is greater than or equal to 5 metres, or greater than or equal to 7 metres, or greater than or equal to 10 metres, and the first optical fibre (40) comprises a non-polarization-maintaining, bending-insensitive fibre.

20 Claims, 4 Drawing Sheets

(58) Field of Classification Search
CPC .. G02B 6/4432; G02B 6/3885; G02B 6/4433; G02B 6/4436; G02B 6/3821; G02B 6/3869; G02B 6/3887; G02B 6/4413; G02B 6/443; G02B 6/4453; G02B 6/46; G02B 6/4416; G02B 6/4472; G02B 6/0365; G02B 6/3608; G02B 6/3863; G02B 6/387; G02B 6/4435; G02B 6/3817; G02B 6/3831; G02B 6/40; G02B 6/4403; G02B 6/4429; G02B 6/4452; G02B 6/4478; G02B 6/4494; G02B 6/0281; G02B 6/3825; G02B 6/3849; G02B 6/4455; G02B 6/4479; G02B 6/4486; G02B 6/02395; G02B 6/0288; G02B 6/03633; G02B 6/3851; G02B 6/3871; G02B 6/4457; G02B 6/4466; G02B 6/3855; G02B 6/3877; G02B 6/3878; G02B 6/3879; G02B 6/4463; G02B 6/4465; G02B 6/4482; G02B 6/02042; G02B 6/03627; G02B 6/389; G02B 6/426; G02B 6/4278; G02B 6/4415; G02B 6/4439; G02B 6/444; G02B 6/4441; G02B 6/4442; G02B 6/4444; G02B 6/4446; G02B 6/4448; G02B 6/4459; G02B 6/448; G02B 27/0012; G02B 6/02028; G02B 6/0218; G02B 6/02209; G02B 6/02214; G02B 6/02333; G02B 6/0283; G02B 6/0286; G02B 6/03672; G02B 6/03694; G02B 6/14; G02B 6/245; G02B 6/255; G02B 6/2551; G02B 6/2552; G02B 6/26; G02B 6/262; G02B 6/268; G02B 6/2856; G02B 6/32; G02B 6/36; G02B 6/3818; G02B 6/3846; G02B 6/3853; G02B 6/3854; G02B 6/3861; G02B 6/3895; G02B 6/4401; G02B 6/4404; G02B 6/446; G02B 6/4475; G02B 6/4488; G02B 6/4497; G02B 6/48; G02B 6/483; G02B 6/50; G02B 6/502; G02B 6/3894; G02B 6/4281; G02B 6/4285; G02B 6/4454; F03D 17/00; F05B 2270/804; G01B 11/168; G01B 11/18; G01B 11/26
See application file for complete search history.

(56) References Cited

U.S. PATENT DOCUMENTS

| | | | | |
|---|---|---|---|---|
| 2011/0058781 | A1* | 3/2011 | Molin | G02B 6/0288 385/126 |
| 2011/0064368 | A1* | 3/2011 | Bookbinder | G02B 6/0365 385/123 |
| 2012/0123702 | A1* | 5/2012 | Chen | G01K 11/32 702/42 |
| 2012/0294575 | A1* | 11/2012 | Chludzinski | G02B 6/03672 385/123 |

FOREIGN PATENT DOCUMENTS

| | | |
|---|---|---|
| DE | 102010005665 A1 | 7/2011 |
| EP | 0120999 A2 | 10/1984 |
| EP | 2003476 A1 | 12/2008 |

OTHER PUBLICATIONS

International Search Report and written opinion report for patent application No. PCT/EP2017/084486, dated Mar. 6, 2018.

\* cited by examiner

APPARATUS AND METHOD FOR MEASURING THE TORSION OF A TEST OBJECT

TECHNICAL FIELD

The disclosure relates to an apparatus for measuring the torsion between a first point and a second point of a test object, said second point being spaced apart from the first point, use of an apparatus for measuring the torsion between a first point and a second point of a test object, said second point being spaced apart from the first point, on a wind power plant, as well as a method for measuring the torsion between a first point and a second point of a test object, said second point being spaced apart from the first point.

Many mechanical system components are subject to static or dynamic loads, the measurement of which is required, for example, for control tasks. A measured quantity of interest is the torsion.

BACKGROUND ART

From the State of the Art, torsion measuring systems for measuring torsion between a first measuring point and a second measuring point of a test object are known. In the published patent application DE 10 2010 005 665 A1, the distance between the first and the second measuring point is connected by an optical fibre. A light source is coupled to the optical fibre directly in the first measuring point which emits polarized light. Directly in the second measuring point, a polarization analyzer is coupled to the optical fibre. Torsion of the test object by incorporating the optical fibre between the measuring points causes rotation of the polarization plane of the light which has been irradiated into the optical fibre by the polarizing light source.

From the publication CN 203 704 884 U, a fibre-optic torsion sensor formed in an embedded design is known. The embedded design permits a torsion measurement over a measuring section of 1 m max.

When a conventional fibre-optic torsion sensor is used in order to determine torsion over a larger measuring section of a test object, it sometimes happens that the sensor fibre in addition to torsion is also subject to bending. This may happen, for example, when the sensor fibre for measuring torsion is used on a curved test object, for example, a lightweight structure of a building or the like.

Bending of the sensor fibre results in a measurement uncertainty and/or a measuring error in conventional torsion sensors. Therefore, it is desirable to provide an apparatus or method for measuring the torsion of a test object in which measurement accuracy is improved.

SUMMARY

Embodiments of the present disclosure provide an apparatus for measuring the torsion between a first point and a second point of a test object, said second point being spaced apart from the first point, according to patent claim 1. Further embodiments of the present disclosure specify use of the apparatus on a wind power plant according to patent claim 9. Further embodiments of the present disclosure specify a method for measuring the torsion between a first point and a second point of a test object, said second point being spaced apart from the first point, according to patent claim 11.

According to an embodiment, an apparatus is specified for measuring the torsion between a first point and a second point of a test object, said second point being spaced apart from the first point, wherein the apparatus includes a source of polarized light including a polarizing light source, which emits polarized light, or a polarizer, which is connected to a light source via an optical feed, wherein the apparatus includes a first optical fibre, which is optically connected to the output of the source, and is fastened to the test object on the first point and on the second point in such a way that a torsion of the test object about a torsion axis causes a change in the angle of rotation of the first optical fibre from the first point in relation to the second point, wherein the apparatus includes a second polarization-maintaining optical fibre that is connected to the first optical fibre in the second point or downstream of the second point in relation to the light path coming from the source, for supplying the light to a measuring device, wherein the distance between the first point and the second point of the test object is greater than or equal to 5 metres, or greater than or equal to 7 metres, or greater than or equal to 10 metres, wherein the first optical fibre includes a non-polarization-maintaining, bending-insensitive fibre.

According to another embodiment, use of an apparatus for measuring the torsion between a first point and a second point of a test object, said second point being spaced apart from the first point, of a wind power plant is specified, wherein the apparatus includes a source of polarized light including a polarizing light source, which emits polarized light, or a polarizer, which is connected to a light source via an optical feed, wherein the apparatus includes a first optical fibre, which is optically connected to the output of the source, and is fastened to the test object on the first point and on the second point in such a way that a torsion of the test object about a torsion axis causes a change in the angle of rotation of the first optical fibre from the first point in relation to the second point; wherein the apparatus includes a second polarization-maintaining optical fibre that is connected to the first optical fibre on the second point or downstream of the second point in relation to the light path coming from the source, for supplying the light to a measuring device, wherein the distance between the first point and the second point of the test object is greater than or equal to 5 metres, or greater than or equal to 7 metres, or greater than or equal to 10 metres, wherein the first optical fibre includes a non-polarization-maintaining, bending-insensitive fibre.

According to another embodiment, a method for measuring the torsion between a first point and a second point of a test object is indicated, said second point being spaced apart from the first point, wherein the method includes providing a first optical fibre between the first point and the second point of the test object in such way that a torsion of the test object about a torsion axis causes a change in the angle of rotation of the first optical fibre from the first point in relation to the second point, wherein the first optical fibre includes a non-polarization-maintaining, bending-insensitive fibre, wherein the method includes providing a second polarization-maintaining optical fibre that is connected to the first optical fibre in the second point or downstream of the second point in relation to a light path from the first point to the second point, and which is leading away from the second point; wherein the method includes radiating of polarized light with a known entrance polarization alignment into the first optical fibre, wherein the method includes detection of an exit polarization alignment of the light exiting the second optical fibre; wherein the method includes evaluation of the exit polarization alignment in relation to the entrance polarization alignment for determining the torsion, wherein the distance between the first point and the second point of the test object is greater than or equal to 5 metres, or greater than or equal to 7 metres, or greater than or equal to 10 metres.

Further aspects and features result, for example, from the features of the dependent patent claims.

BRIEF DESCRIPTION OF THE DRAWINGS

Embodiments of the invention are shown in the drawings and are explained more in detail in the description below. In the drawings.

EMBODIMENTS WAYS FOR CARRYING OUT THE INVENTION

Embodiments of the invention are explained more in detail below. The drawings serve for illustrating one or several examples of embodiments of the invention.

Figure 1:
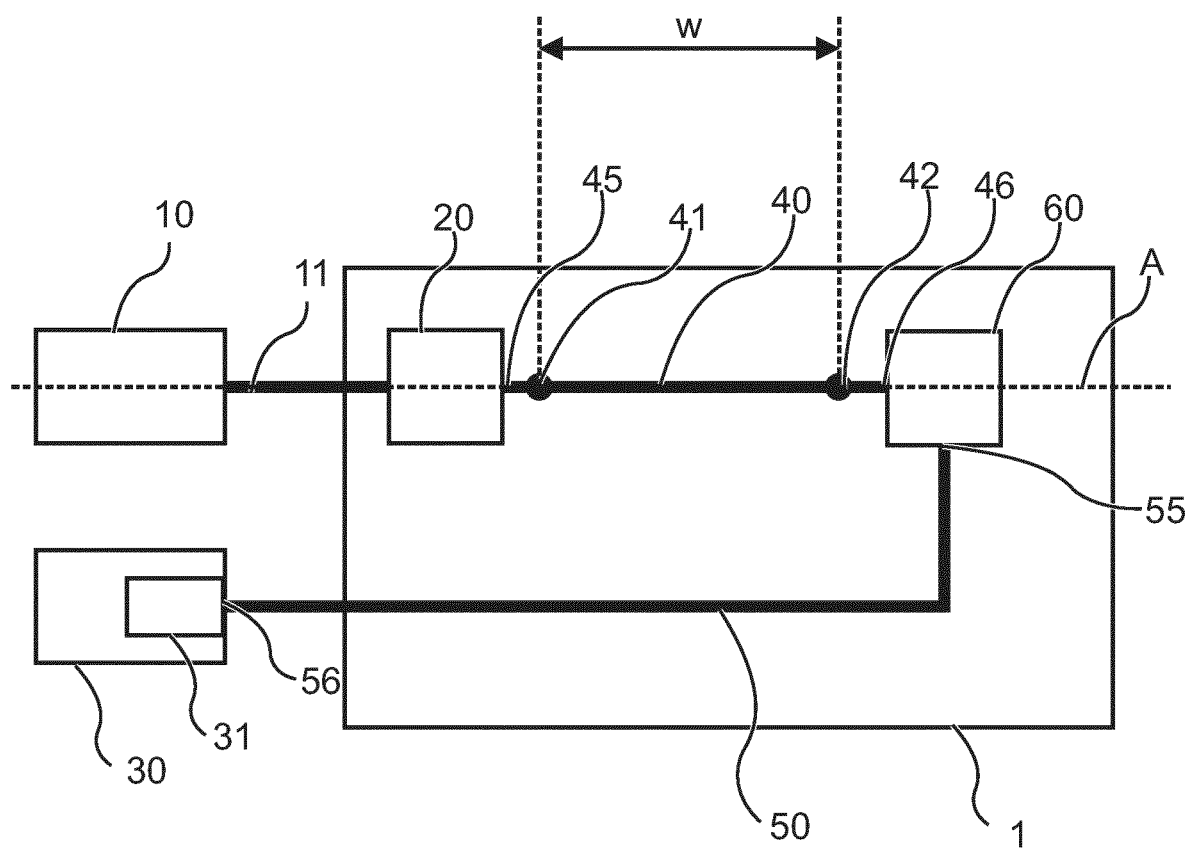
FIG. 1 is a schematic representation of an apparatus for measuring the torsion of a test object according to an embodiment of the invention.

Embodiments described herein relate among others to an apparatus for measuring the torsion between a first point and a second point of a test object, said second point being spaced apart from the first point. FIG. 1 shows a schematic representation of an apparatus for measuring the torsion of a test object 1 according to an embodiment.

In the apparatus, a polarizer 20 is located downstream of a light source 10, wherein the polarizer 20 is optically connected to the output of the light source 10. In the embodiment shown, the light source 10 is formed in a non-polarizing manner, and the optical connection between the output of the light source 10 and the input of the polarizer 20 occurs by means of an optical feed. Alternatively, also a polarizing light source can be provided, which emits polarized light, as will still be described below in connection with further embodiments. The light source 10 with a polarizer 20 located downstream or—in the case of other embodiments—the polarizing light source forms a source of polarized light on the output of which light exits which includes a defined polarization alignment. It has to be observed that the polarization alignment of the polarizing light source and that of the separate polarizer 20 are not offset from each other in the range of approx. 90° in order to avoid a too high attenuation of the light fraction which passes through the polarizer 20.

Typically, the polarizer 20 is formed as a linear polarizer and/or the polarizing light source emits linearly polarized light. At the output of the source of polarized light, light exists then, the polarization alignment of which to a polarization plane is restricted. The polarization alignment is known and can be used in an evaluation in the form of a comparison of the polarization alignments.

According to the embodiment shown in FIG. 1, the light source 10 is located off the test object 1 and supplies unpolarized light to the polarizer 20 via an optical feed 11. According to the embodiment, the optical feed 11 is formed as an optical fibre, for example, as a single mode optical fibre, but is not restricted to it.

The polarizer 20 itself can be located on the test object 1; but it is also possible to locate the polarizer off the test object 1, and to supply the polarized light to a first optical fibre 40 by means of an auxiliary optical fibre.

The first optical fibre 40 is optically connected to the output of the source of polarized light; In the embodiment shown in FIG. 1, the first optical fibre 40 is optically connected to the output of the polarizer 20. The first optical fibre 40 can be optically impinged with polarized light which exits from the source of polarized light.

The first optical fibre 40 is fastened to the test object 1 on a first point 41 and on a second point 42 in such a way that a torsion of the test object 1 about a torsion axis A causes a change in the angle of rotation of the first optical fibre 40 from the first point 41 in relation to the second point 42. The torsion axis A does not coincide mandatorily with an actual geometric axis of the test object 1 or the like. Rather, the torsion axis A is an imaginary line through the test object 1 and/or on the surface of the test object 1 about which a torsion of the test object 1 to be measured occurs, wherein the torsion to be measured is reflected in a change in the angle of rotation between the first point 41 of the first optical fibre 40 and the second point 42 of the first optical fibre 40. Fastening of the first optical fibre 40 can indirectly occur also by the fact that the polarizer 20 itself is fastened on the first point. But the invention is not restricted to this possibility.

A second optical fibre 50 is connected to the first optical fibre 41 on the second point 42 or downstream of the second point 42 in relation to the light path coming from the source of polarized light. The second optical fibre 50 serves for supplying light to a measuring device 30.

The second optical fibre 50 is a polarization-maintaining fibre (PMF). The second optical fibre 50 is a polarization-maintaining fibre (PMF). Therefore, regardless of a torsion of the second optical fibre 50, the polarization plane of the light, which is irradiated on a first end 55 of the second optical fibre 50, is maintained during propagation of the light within the second optical fibre 50. Thus, light is supplied to the measuring device 30, which has the polarization alignment, which exists at the end of the torsion measurement section between the first point 41 and the second point 42. In the case of a comparison with the polarization alignment on the point of impingement of the first optical fibre 40, said polarization alignment permits conclusions with respect to a torsion acting on the test object 1 along the torsion axis A.

Such a torsion and the associated influence of the first optical fibre 40 is described below. Due to the mechanical connection of the first optical fibre 40 in the first point 41 and in the second point 42 to the test object 1, the first optical fibre 40 in its torsion largely follows the torsion of the test object between the points 41, 42. This section of the first optical fibre 40 forms the fibre-optic measurement section. The measurement section has a length of 5 metres or more, typically 7 metres or more or 10 metres or more. In other words: the distance between the first point 41 and the second point 42 is 5 metres or more, typically 7 metres or more or 10 metres or more. Measurement sections with a length of 5 metres or more can result, for example, in the case of torsion measurement on a lightweight structure of a building. A nonlimiting example for a lightweight structure is a rotor blade of a wind power plant.

The first optical fibre 40 is non polarization-maintaining, for example, a single mode fibre. Moreover, the first optical fibre 40 is formed in a bending-insensitive manner. Bending-insensitive, as it is used here, includes a low power attenuation at a relatively small bending radius of the optical fibre. A suitable, bending-insensitive fibre—as a nonlimiting example—is commercially available from the manufacturer Corning® under the designation of ClearCurve® ZBL.

For example, a non-polarization-maintaining, bending-insensitive fibre has a power attenuation of less than 0.2 dB or of less than 0.1 dB, at an exemplary bending radius of 5 mm on a light wavelength used for measurement and at an individual winding of a test body with the radius specified. A wavelength used for measurement is, for example, and without restriction a wavelength of approx. 1550 nm.

During operation of the apparatus, polarized light is supplied to the first optical fibre 40 on its first end 45. A torsion of the test object 1 is converted into a torsion of the first optical fibre 40 by fastening between the first point 41 and the second point 42. The torsion angle is mapped as an angle between fibre and polarization plane. Due to the non polarization-maintaining properties of the first optical fibre 40, in the case of a torsion of the test object 1 about the torsion axis A, a rotation of the polarization plane between the first end 45 of the first optical fibre 40 and the second end 46 of the first optical fibre 40 results. Hence, the first optical fibre 40 acts as a fibre-optic sensor.

The first end 45 of the first optical fibre 40 is located as close as possible to the first point 41, for example, at a distance of less than 10 cm or less than 5 cm. This can help to avoid distortion of the polarization alignment on the distance between the first end 45 and the first point 41. In a similar way, the second end 46 of the first optical fibre 40 is located as close as possible to the second point 42, for example, at a distance of less than 10 cm or less than 5 cm. This can help to avoid distortion of the polarization alignment on the distance between the second point 42 and the second end 46.

Such a structure can help to reduce or to eliminate a measuring error and/or a measuring inaccuracy which is caused by bending of the first optical fibre 40. Bending can be caused, for example, on the measurement section due to bending of the test object 1. Bending cross-sensitivity of the first optical fibre 40 is reduced by use of the bending-insensitive fibre which can help to improve the measuring accuracy.

Figure 2:
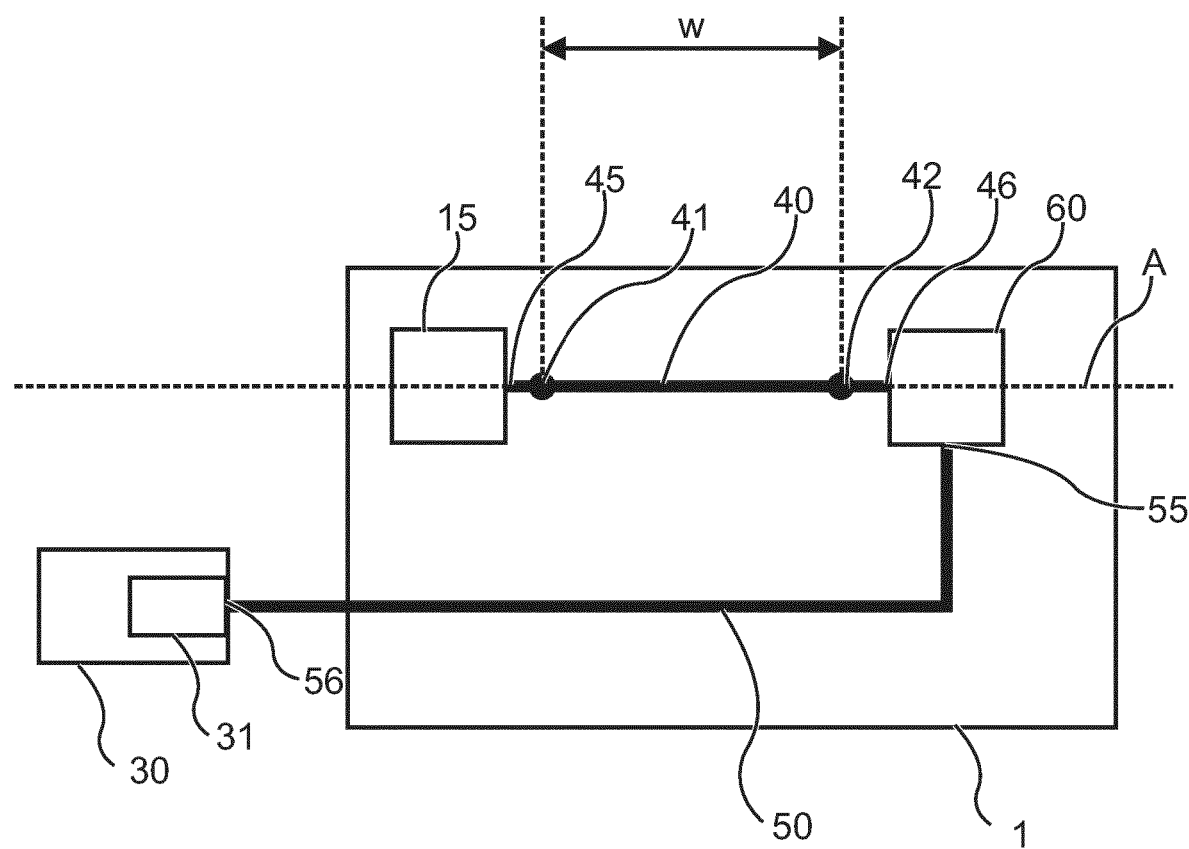
FIG. 2 is a schematic representation of an apparatus for measuring the torsion of a test object according to another embodiment of the invention.

FIG. 2 is a schematic representation of an apparatus for measuring the torsion on a test object 1 according to still another embodiment. The apparatus according to FIG. 2 is similar to the apparatus according to FIG. 1, and the repeated description of the same features or features having the same effect is omitted here. Instead of a combination of a light source and a polarizer 20, a polarizing light source 15 is used in the embodiment according to FIG. 2. In the embodiment, the polarizing light source 15 is directly located on the test object 1 in close proximity to the first end 45 of the first optical fibre 40. In the embodiment shown in FIG. 2, the first end 45 is connected directly to the polarizing light source.

Figure 3:
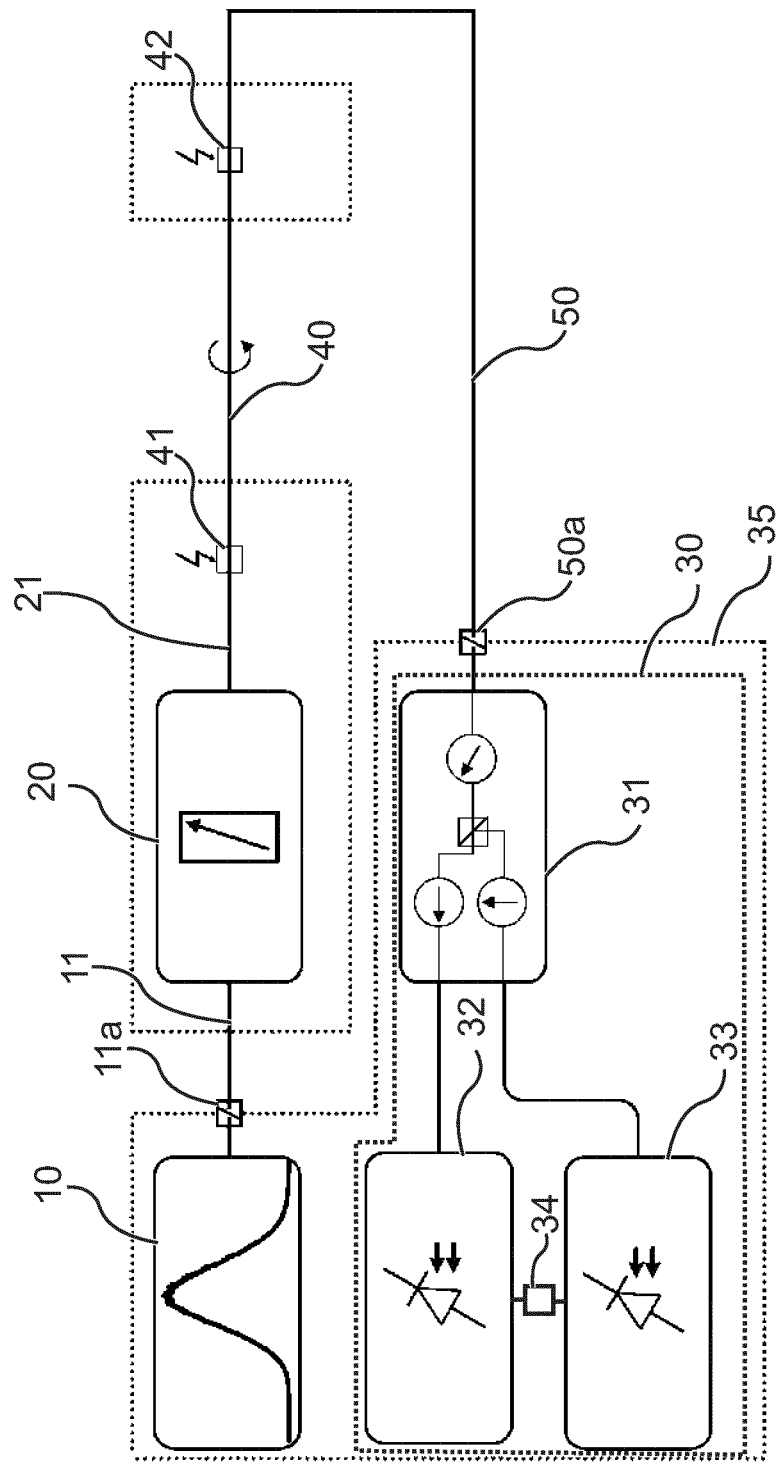
FIG. 3 is a schematic representation of an apparatus for measuring the torsion of a test object according to still another embodiment of the invention.

FIG. 3 is a schematic representation of an apparatus for measuring the torsion on a test object according to still another embodiment of the invention.

In the embodiment according to FIG. 3, a light source 10 is connected to a linear polarizer 20 via an optical feed 11. A suitable optical connector, for example, a suitable plug connector or APC connector, is provided on the connection point 11a between the light source 10 and the optical feed.

On the output side, the linear polarizer 20 is connected via a short section of an optical auxiliary line 21 to a bending-insensitive, non-polarization-maintaining first optical fibre 40 by means of a splice. In FIG. 3, the splice forms the first point 41 of the measurement section. On the second point 42 of the measurement section according to FIG. 3, again a splice is provided which connects the first optical fibre 40 with a second optical fibre 50. In the first point 41 and in the second point 42, the first optical fibre 40 is mechanically connected to a test object 1 (not shown in FIG. 3) in such a manner that a torsion of the test object 1 about a torsion axis causes a change in the angle of rotation of the first optical fibre 40 from the first point 41 in relation to the second point 42. Said change in the angle of rotation of the first optical fibre 40 is indicated in FIG. 3 with a circumferential arrow.

The second optical fibre 50 is formed as a polarization-maintaining fibre and connected on a connection point 50a to an integrated measuring unit designated in total with 35 into which the measuring device 30 and the light source 10 are integrated. The measuring device 30 includes in FIG. 3 a polarization splitter 31, a first photodiode 32 acting as a first measuring element, and a second photodiode 33 acting as a second measuring element. For separating the light supplied to the measuring device 30, hence the light from the second optical fibre, the polarization splitter 31 is configured into a first linear polarization alignment and into a second linear polarization alignment different from the first one. Typically, the first linear polarization alignment is substantially perpendicular to the second linear polarization alignment.

A suitable optical connector, for example, a suitable plug connector or APC connector is provided on the connection point 50a between the second optical fibre 50 and the integrated measuring unit 35, and the light from the second optical fibre 50 is supplied to the polarization splitter 31 in the integrated measuring unit 35.

The light is supplied to the first photodiode 32 with the first linear polarization alignment, and the light is supplied to the second photodiode 33 with the second linear polarization alignment. Moreover, in the embodiment shown in FIG. 3, the measuring device 30 includes an evaluation unit 34. The first photodiode 32 emits a first measuring signal to the evaluation unit 34 corresponding to the intensity of the light with the first linear polarization alignment. Accordingly, the second photodiode 32 emits a second measuring signal to the evaluation unit 34 corresponding to the intensity of the light with the second linear polarization alignment.

The substantially linearly polarized light from the polarizer 20 due to the passing through the light path from the first optical fibre 40, the second optical fibre 50 and the possibly existing connection points, splices and the like can include undesirable circular polarization components. Such circular polarization effects can, for example, also occur by bending of one of the fibres 40, 50.

Figure 4:
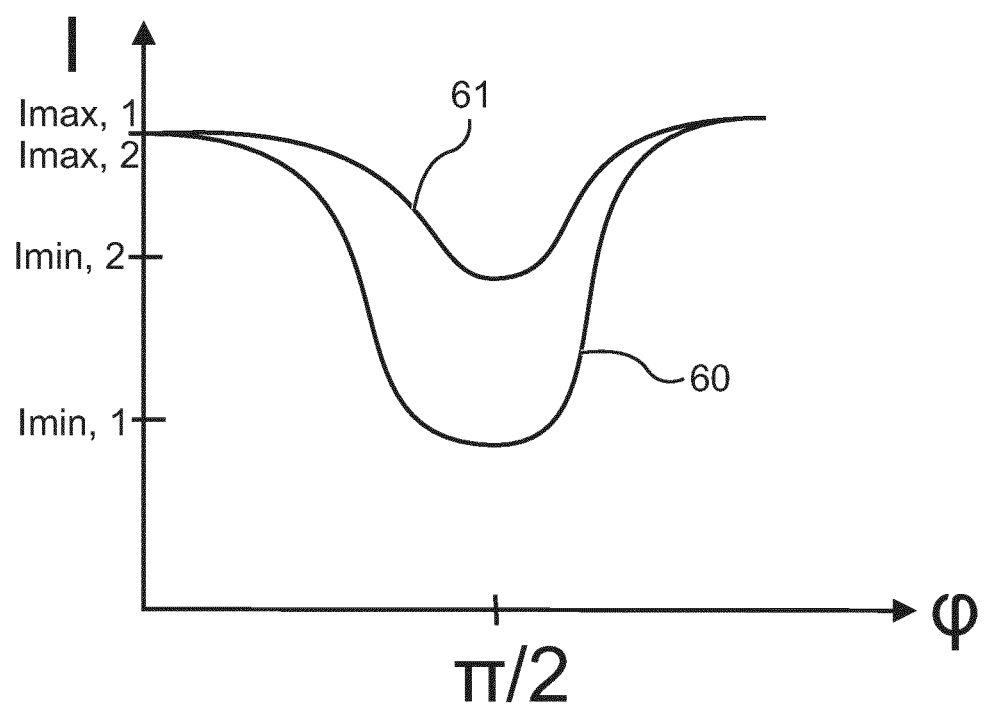
FIG. 4 is a schematic pattern of measured light intensities in an apparatus according to FIG. 3 as a function of the torsion angle.

FIG. 4 shows a schematic pattern of measured light intensities in an apparatus according to FIG. 3 as a function of the torsion angle. The torsion angle $\varphi$ is plotted on the abscissa axis and the intensity I of the light measured is plotted on the ordinate axis. A first intensity pattern 60 includes a low portion of circularly polarized light. The distance between the maximum value Imax,1 and the minimum value Imin,1 of the first intensity pattern 60 is relatively large. A second intensity pattern 61 has a larger portion of circularly polarized light than that of the first intensity pattern 60. The distance between the maximum value Imax,2 and the Imin,2 of the second intensity pattern 61 is large compared with that of the first intensity pattern 60. In other words: with increasing portion of circularly polarized light, signal quality decreases.

The evaluation unit 34 is configured to evaluate the first measuring signal and the second measuring signal with respect to each other. The first and second linear polarization alignment with the construction of polarization splitter 31, first photodiode 32 and second photodiode 33 are measured separately from each other. Separate measurement of the first and second linear polarization alignment may permit to equalize and/or compensate an undesirable circular polarization at least partly.

In embodiments it is provided that the evaluation unit is configured to carry out a compensation calculation by using the first measuring signal and the second measuring signal for improving the evaluation. For example, in a compensation calculation, corresponding correction factors are determined from the separate measurement of the first and second linear polarization alignment. A compensation calculation can be carried out as it is described in the following document: F. Rieger, "Verification of a fibre-optic torsion sensor", T U Munich 2016, Institute for Measuring Systems and Sensor Technology, completed work in Research Practice, No. FP0048.

In embodiments it is provided that the apparatus includes at least one optical fibre connection by means of which individual optical fibre sections are connected with each other, wherein the optical fibre connection includes a connection protection made of a material which has a low linear temperature expansion coefficient. Examples for a low linear temperature expansion coefficient or thermal expansion coefficient include a linear thermal expansion coefficient of $250 \times 10^{-6}$ m/(m·K) or less or of $100 \times 10^{-6}$ m/(m·K) or less.

For example, it can be provided that individual or all connections including the splices and the connection points 11a, 50a are provided with a sealing material as a connection protection which has a low temperature expansion coefficient. As a sealing material or filling material or adhesive with a low temperature expansion coefficient, for example, silicone is mentioned without restriction. By this, the splices and/or connection points can be protected against dirt, loads and/or other environmental influences. Due to the fact that the sealing material has a low temperature expansion coefficient, an undesirable temperature cross-sensitivity of the first optical fibre 40 can be reduced or prevented. The respective optical fibre can be mechanically decoupled from the connection protection.

Moreover it is provided in embodiments that the apparatus includes at least an optical fibre connection by means of which individual optical fibre sections are connected with each other, wherein the optical fibre connection includes a connection protection made of a material which has a modulus of elasticity of 50 N/mm2 or less or of 30 N/mm$^2$ or less or of 5 N/mm$^2$ or less.

Similar to the case of the connection protection described made of the material with the low linear temperature expansion coefficient, also in the case of the connection protection made of the material with the modulus of elasticity in the range specified, it can be provided that individual or all connections including the splices and the connection points 11a, 50a are provided with a sealing material as a connection protection which is formed of the material with the modulus of elasticity in the range specified. Due to the fact that the sealing material has a modulus of elasticity of 50 N/mm$^2$ or less or of 30 N/mm$^2$ or less or of 5 N/mm$^2$ or less, the sealing material is soft enough so that influences stemming from its thermal expansion behaviour are not transferred to the optical fibres or only transferred to the optical fibres to a minor extent. The respective optical fibre can again be mechanically decoupled from the connection protection.

In embodiments it is provided that the length of the optical feed 11 is larger than the length of the second polarization-maintaining fibre 50. Here, a polarizer 20 is located downstream of the light source 10, as has been described above in connection with FIG. 1. The optical feed 11 is typically formed as a single mode fibre (SMF). A single mode fibre is normally more cost-effective than a polarization-maintaining fibre. For example, the integrated measuring unit 35 is located on one side of the test object 1 (not shown in FIG. 3) and the second point is positioned closer to the integrated measuring unit 35 than the first point 41. With regard to the light path, the polarizer 20 is positioned in close proximity to the first point 41 or in the first point 41. The optical feed 11 serves for supplying the light from the light source 10 to the polarizer 20. An area around the polarizer 20 then represents a turning point of the composite of optical feed 11, first optical fibre 40 and second optical fibre 50. The measurement section between the first point 41 and the second point 42 is located behind the turning point in the example. Thus, the measurement section through the first optical fibre 40 is provided on the returning fibre section. In such an arrangement, the measuring signal needs only be lead in a polarization-maintaining fibre (the second optical fibre 50) via a distance which is relatively short.

In embodiments, the measuring device 30 is located off the second point 42. Alternatively or in addition, the source of polarized light is located off the first point 41. According to one aspect, the source of polarized light is located off the first point 41, preferably off the test object 1. In embodiments, the light source 10 of the source of polarized light is located off the first point 41. Preferably, the light source 10 is located off the test object 1. In further embodiments, the polarized light source 15 is located off the test object 1. This may, for example, result in an improvement of flexibility.

In a further embodiment, an apparatus described herein for measuring the torsion between a first point and a second point of a test object, said second point being spaced apart from the first point, on a wind power plant is used. The test object is a rotor blade of a wind power plant. The first point or the second point are located in the area of the root of the rotor blade, and the apparatus is used in order to measure the torsion angle of the rotor blade about a torsion axis of the rotor blade.

A wind power plant, where the apparatus described herein is used, typically includes a nacelle with a rotor hub, wherein the root of the rotor blade in the area of the hub is fastened to the same. In the area of the root of the rotor blade, a blade bulkhead can be provided, which permits access to the interior of the rotor blade, for example, for maintenance purposes. Preferably it is provided that the first point or the second point, which is located in the area of the root of the rotor blade, is located behind the blade bulkhead when viewed from the rotor hub in the direction of the rotor blade tip.

According to one aspect, the torsion angle is continuously measured and continuously used in a monitoring method. The monitoring method can, for example, be a method which calculates a service life forecast or, for example, a method for forecasting break due to fatigue or the like. Compared with conventional solutions, a particularly simple, cost-effective and precise measurement of the torsion angle of a rotor blade on a wind power plant is possible by means of the apparatus.

According to one aspect, the torsion angle measured is used in a management or control process of the wind power plant. According to an aspect, the torsion angle is continuously measured and continuously used in the management or control process. Continuously designates not only a continuous measurement, for example, in an analogous control process but also a continuous sampling of the measured quantity, for example, in a digital control process. Measurement of the torsion angle of the rotor blade by means of the apparatus described herein is possible in a simple manner which permits to reliably carry out the management or control process.

According to another aspect, an apparatus described herein is used in a method for measuring the torsion between a first point and a second point of a test object, said second point being spaced apart from the first point.

A method includes in particular a method for measuring the torsion between a first point 41 and a second point 42 of a test object 1, said second point 42 being spaced apart from the first point 41, wherein the method includes providing a first optical fibre 40 between the first point 41 and the second point 42 of the test object 1 in such way that a torsion of the test object 1 about a torsion axis causes a change in the angle of rotation of the first optical fibre 40 from the first point 41 in relation to the second point 42, wherein the first optical fibre 40 includes a non-polarization-maintaining, bending-insensitive fibre; wherein the method includes providing a second polarization-maintaining optical fibre 50 that is connected to the first optical fibre 40 in the second point 42 or downstream of the second point 42 in relation to a light path from the first point 41 to the second point 42, and which is leading away from the second point 42; wherein the method includes radiating of polarized light with a known entrance polarization alignment into the first optical fibre 40; wherein the method includes detection of an exit polarization alignment of the light exiting the second optical fibre 50; wherein the method includes evaluation of the exit polarization alignment in relation to the entrance polarization alignment for determining the torsion, wherein the distance between the first point 41 and the second point 42 of the test object is greater than or equal to 5 metres, or greater than or equal to 7 metres, or greater than or equal to 10 metres.

In the embodiments, it is also possible to reverse the light path, that means to exchange the component parts on the light impinging side and on the light receiving light evaluating side. In particular, it is also possible to exchange the source 15, 10, 20 of polarized light and the evaluation unit 30, 31.

It is pointed out here that the aspects and embodiments described herein can be adequately combined with each other, and that individual aspects can be omitted where it is reasonable and possible within the scope of action skilled in the art. Modifications and amendments of the aspects described herein are familiar to the person skilled in the art.

The invention claimed is:

1. An apparatus for measuring the torsion between a first point and a second point of a test object, said second point being spaced apart from the first point, comprising:
   a source of polarized light comprising a polarizing light source emitting polarized light, or a polarizer which is connected to a light source via an optical feed;
   a first optical fibre, which is optically connected to the output of the source, and is fastened to the test object on the first point and on the second point in such a way that a torsion of the test object about a torsion axis causes a change in the angle of rotation of the first optical fibre from the first point in relation to the second point, and
   a second polarization-maintaining optical fibre that is connected to the first optical fibre in the second point or downstream of the second point in relation to the light path coming from the source, for supplying the light to a measuring device,
   wherein the distance between the first point and the second point of the test object is greater than or equal to 5 metres, or greater than or equal to 7 metres, or greater than or equal to 10 metres,
   wherein the first optical fibre comprises a non-polarization-maintaining, bending-insensitive fibre,
   wherein the non-polarization-maintaining, bending-insensitive fibre at a bending with a bending radius of 5 mm on a light wavelength used for measurement has a power attenuation of less than 0.2 dB or of less than 0.1 dB.

2. The apparatus according to claim 1,
   wherein the length of the optical feed is larger than the length of the second polarization-maintaining optical fibre.

3. The apparatus according to claim 1, wherein the measuring device comprises:
   a polarization splitter for separating the light supplied to the measuring device into a first linear polarization alignment and into a second linear polarization alignment different from the first one;
   a first measuring element to which the light is supplied with the first linear polarization alignment, for emitting a first measuring signal;
   a second measuring element to which the light is supplied with the second linear polarization alignment, for emitting a second measuring signal;
   an evaluation unit to which the first measuring signal and the second measuring signal are supplied for evaluation of the measuring signals with respect to each other.

4. The apparatus according to claim 3,
   wherein the evaluation unit is configured to carry out a compensation calculation by using the first measuring signal and the second measuring signal for improving the evaluation.

5. The apparatus according to claim 1,
   wherein the apparatus moreover comprises at least one optical fibre connection by means of which individual optical fibre sections are connected to each other, wherein the optical fibre connection comprises a connection protection made of a material which has a linear thermal expansion coefficient of $250 \times 10^{-6}$ m/(m·K) or less or of $100 \times 10^{-6}$ m/(m·K) or less.

6. The apparatus according to claim 1,
   wherein the apparatus moreover comprises at least one optical fibre connection by means of which individual optical fibre sections are connected to each other, wherein the optical fibre connection comprises a connection protection made of a material which has a modulus of elasticity of 50 N/mm$^2$ or less or of 30 N/mm$^2$ or less or of 5 N/mm$^2$ or less.

7. The apparatus according to claim 1,
   wherein the measuring device is located off the second point or wherein the source is located off the first point.

8. A use of an apparatus for measuring the torsion between a first point and a second point of a test object, said second point being spaced apart from the first point, on a wind power plant, wherein the apparatus comprises:
   a source of polarized light comprising a polarizing light source emitting polarized light, or a polarizer which is connected to a light source via an optical feed;
   a first optical fibre, which is optically connected to the output of the source, and is fastened to the test object on the first point and on the second point in such a way that a torsion of the test object about a torsion axis causes a change in the angle of rotation of the first optical fibre from the first point in relation to the second point, and a second polarization-maintaining optical fibre that is connected to the first optical fibre in the second point or downstream of the second point in relation to the light path coming from the source, for supplying the light to a measuring device, wherein the distance between the first point and the second point of the test object is greater than or equal to 5 metres, or greater than or equal to 7 metres, or greater than or equal to 10 metres, wherein the first optical fibre comprises a non-polarization-maintaining, bending-insensitive fibre, wherein the non-polarization-maintaining, bending-insensitive fibre at a bending with a bending radius of 5 mm on a light wavelength used for measurement has a power attenuation of less than 0.2 dB or of less than 0.1 dB, wherein the test object is a rotor blade of the wind power plant, for measuring a torsion angle of the rotor blade.

9. The use according to claim 8, wherein the torsion angle measured is used in a management and control process of the wind power plant.

10. A method for measuring the torsion between a first point and a second point of a test object, said second point being spaced apart from the first point, comprising:

providing a first optical fibre between the first point and the second point of the test object in such way that a torsion of the test object about a torsion axis causes a change in the angle of rotation of the first optical fibre from the first point in relation to the second point wherein the first optical fibre comprises a non-polarization-maintaining, bending-insensitive fibre, wherein the non-polarization-maintaining, bending-insensitive fibre at a bending with a bending radius of 5 mm on a light wavelength used for measurement has a power attenuation of less than 0.2 dB or of less than 0.1 dB;

providing a second polarization-maintaining optical fibre that is connected to the first optical fibre in the second point or downstream of the second point in relation to a light path from the first point to the second point, and which is leading away from the second point;

radiating of polarized light with a known entrance polarization alignment into the first optical fibre;

detecting an exit polarization alignment of the light exiting the second optical fibre; and evaluating the exit polarization alignment in relation to the entrance polarization alignment for determining the torsion, wherein the distance between the first point and the second point of the test object is greater than or equal to 5 metres, or greater than or equal to 7 metres, or greater than or equal to 10 metres.

11. The apparatus according to claim 2, wherein the measuring device comprises:

a polarization splitter for separating the light supplied to the measuring device into a first linear polarization alignment and into a second linear polarization alignment different from the first one;

a first measuring element to which the light is supplied with the first linear polarization alignment, for emitting a first measuring signal;

a second measuring element to which the light is supplied with the second linear polarization alignment, for emitting a second measuring signal;

an evaluation unit to which the first measuring signal and the second measuring signal are supplied for evaluation of the measuring signals with respect to each other.

12. The apparatus according claim 2, wherein the apparatus moreover comprises at least one optical fibre connection by means of which individual optical fibre sections are connected to each other, wherein the optical fibre connection comprises a connection protection made of a material which has a linear thermal expansion coefficient of $250 \times 10^{-6}$ m/(m·K) or less or of $100 \times 10^{-6}$ m/(m·K) or less.

13. The apparatus according to claim 3, wherein the apparatus moreover comprises at least one optical fibre connection by means of which individual optical fibre sections are connected to each other, wherein the optical fibre connection comprises a connection protection made of a material which has a linear thermal expansion coefficient of $250 \times 10^{-6}$ m/(m·K) or less or of $100 \times 10^{-6}$ m/(m·K) or less.

14. The apparatus according to claim 4, wherein the apparatus moreover comprises at least one optical fibre connection by means of which individual optical fibre sections are connected to each other, wherein the optical fibre connection comprises a connection protection made of a material which has a linear thermal expansion coefficient of $250 \times 10^{-6}$ m/(m·K) or less or of $100 \times 10^{-6}$ m/(m·K) or less.

15. The apparatus according to claim 2, wherein the apparatus moreover comprises at least one optical fibre connection by means of which individual optical fibre sections are connected to each other, wherein the optical fibre connection comprises a connection protection made of a material which has a modulus of elasticity of 50 N/mm$^2$ or less or of 30 N/mm$^2$ or less or of 5 N/mm$^2$ or less.

16. The apparatus according to claim 3, wherein the apparatus moreover comprises at least one optical fibre connection by means of which individual optical fibre sections are connected to each other, wherein the optical fibre connection comprises a connection protection made of a material which has a modulus of elasticity of 50 N/mm$^2$ or less or of 30 N/mm$^2$ or less or of 5 N/mm$^2$ or less.

17. The apparatus according to claim 4, wherein the apparatus moreover comprises at least one optical fibre connection by means of which individual optical fibre sections are connected to each other, wherein the optical fibre connection comprises a connection protection made of a material which has a modulus of elasticity of 50 N/mm$^2$ or less or of 30 N/mm$^2$ or less or of 5 N/mm$^2$ or less.

18. The apparatus according to claim 1, wherein the measuring device is located off the second point and wherein the source is located off the first point.

19. The apparatus according to claim 2, wherein the measuring device is located off the second point or wherein the source is located off the first point.

20. The apparatus according to claim 2, wherein the measuring device is located off the second point and wherein the source is located off the first point.

* * * * *